United States Patent

[11] 3,590,372

[72] Inventors Dominic P. DeSantis
Millbrook;
Ralph G. Dessauer, Poughkeepsie; Edward F. Gorey, Beacon; Michael R. Poponiak, Newburgh; Christian P. Schneider, Wappingers Falls; Paul A. Schumann, Jr., Wappingers Falls, all of, N.Y.
[21] Appl. No. 786,962
[22] Filed Dec. 26, 1968
[45] Patented June 29, 1971
[73] Assignee International Business Machines Corporation
Armonk, N.Y.

[54] SPREADING RESISTANCE METHOD AND APPARATUS FOR DETERMINING THE RESISTIVITY OF A MATERIAL
35 Claims, 11 Drawing Figs.
[52] U.S. Cl. .................................... 324/64, 324/72.5, 324/158
[51] Int. Cl. ...................................... G01n 27/14
[50] Field of Search ................................ 324/64 (P, SM, RR), 72.5, 158 D, 158 P

[56] References Cited
UNITED STATES PATENTS

| | | | |
|---|---|---|---|
| 1,426,620 | 8/1922 | Vawter | 324/64 RR UX |
| 2,659,862 | 11/1953 | Branson | 324/64 |
| 2,677,106 | 4/1954 | Haynes et al. | 324/158 |
| 2,765,440 | 10/1956 | Adelman et al. | 324/20 |
| 3,345,567 | 10/1967 | Turner et al. | 324/158 |
| 1,823,471 | 9/1931 | Roller | 324/64 X |
| 3,264,556 | 8/1966 | Krantz | 324/62 |

FOREIGN PATENTS

| | | | |
|---|---|---|---|
| 506,173 | 5/1939 | Great Britain | 324/64 |
| 1,011,134 | 11/1965 | Great Britain | 324/158 D UX |

OTHER REFERENCES

Gardner, E. E. and Schumann, Jr., P. A. " Measurement of Resistivity of Silicon Epitaxial Layers by the Three-Point Probe Technique," in SOLID STATE ELECTRONICS, Vol. 8 #2. pp. 165 – 174. 1965. TK 7800 S 58

Gardner, E. E. and Schumann, Jr., P. A. and Gorey, E. F. " Resistivity Profiles and Thickness Measurements of Multilayered Semiconductor Structures by the Spreading Resistance Technique," in MEASUREMENT TECHNIQUES FOR THIN FILMS, edited by Bertram and Newton Schwartz, N.Y., Electro-Chemical Society, 1967, pp. 258– 273, copy in GR 258 CL324/64 SM Valley, D. J. " Probe Shows Silicon Resistivity Accurately." in ELECTRONICS. March 31, 1961 TK 7800 E. 58. pp. 70, 72, 75.

*Primary Examiner*—Edward E. Kubasiewicz
*Attorneys*—Hanifin and Clark and Wolmar J. Stoffel

ABSTRACT: A three-point probe is employed to determine the spreading resistance of a material with the spreading resistance probe, which is common to both the current source and a voltage measuring means, being moved into engagement with the material after the other two probes are in engagement with the material. The velocity with which each of the probes engages the material is controlled and is variable. To ascertain that a good contact has been made by the spreading resistance probe and the magnitude of the current flowing through the material from the current source, the voltage measuring means is connected across resistance means in the wire from the current source to the spreading resistance probe and current is directed through the resistance means in opposite directions by flowing through the material between the spreading resistance probe and one of the other two probes. After the magnitude of the current has been determined, the voltage measuring means is connected to the spreading resistance probe adjacent its contact to the material and to the other of the two probes, which is not connected to the current source, to determine the voltage drop through the material due to current from the current source flowing in opposite directions through the material. The amount of difference between the two voltage readings on the specimen indicates if good contact is achieved.

PATENTED JUN29 1971

INVENTORS
DOMINIC P. DESANTIS
RALPH G. DESSAUER
EDWARD F. GOREY
MICHAEL R. POPONIAK
CHRISTIAN P. SCHNEIDER
PAUL A. SCHUMANN JR.

BY *Frank C. Loach Jr.*
ATTORNEY

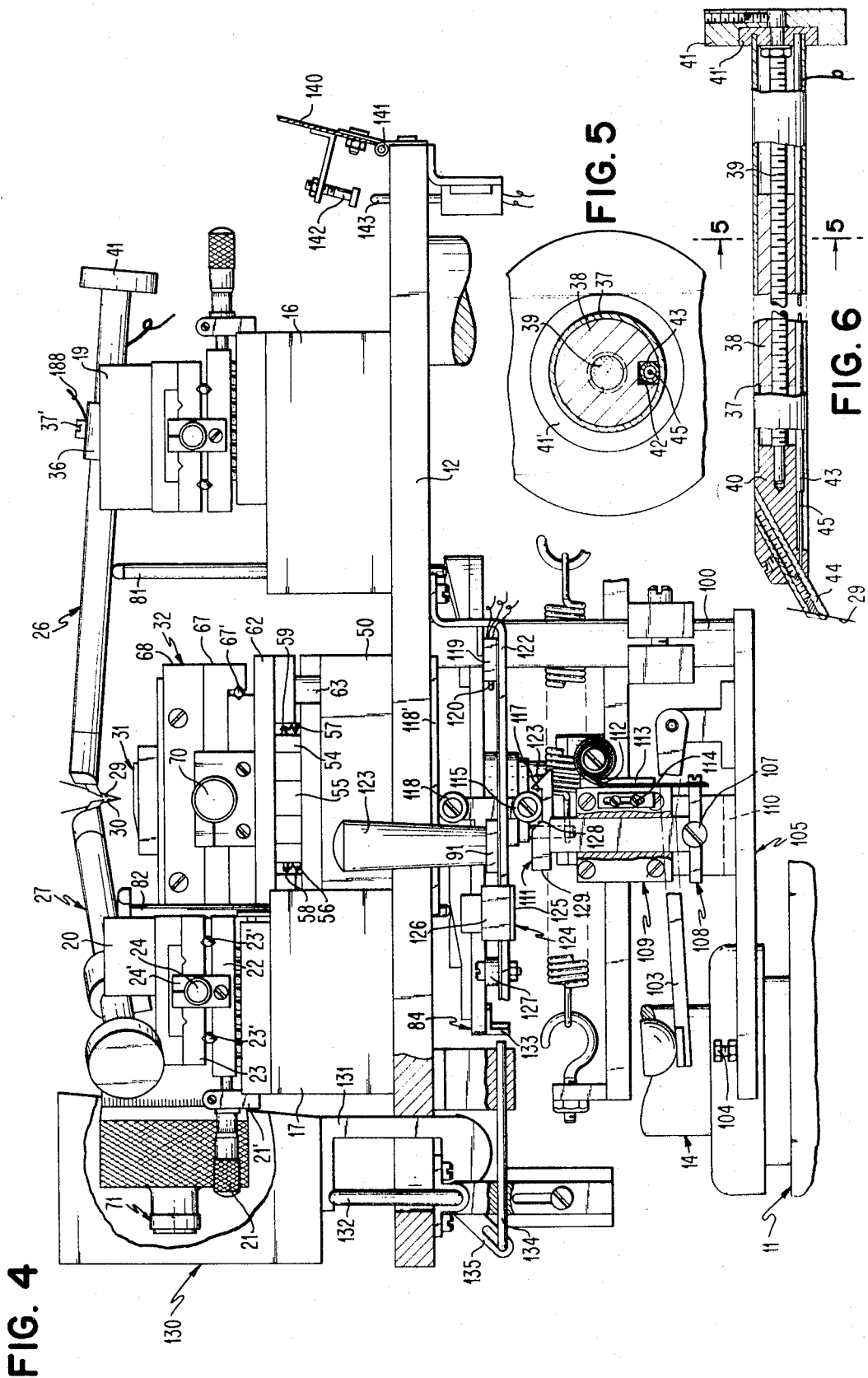

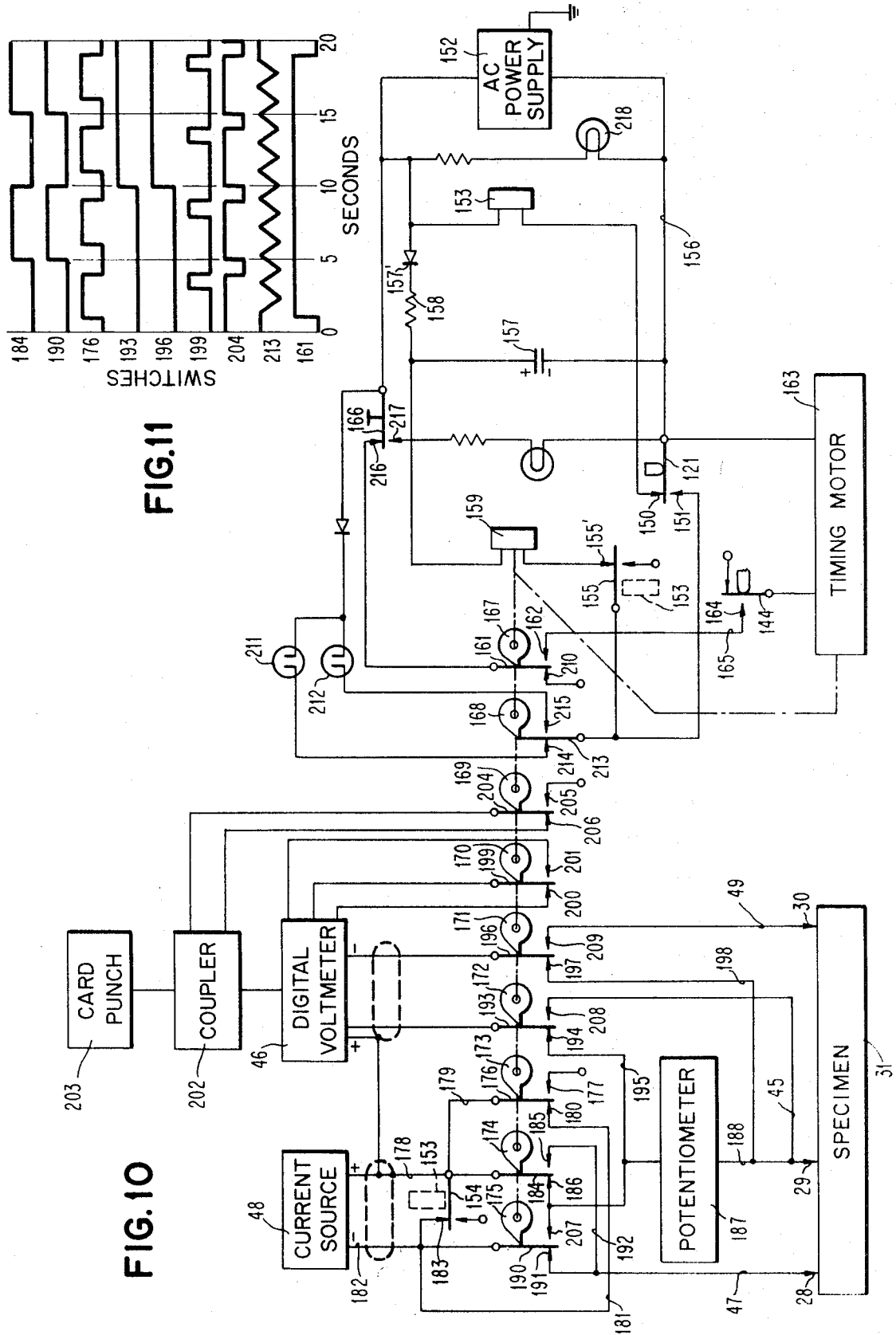

SPREADING RESISTANCE METHOD AND APPARATUS FOR DETERMINING THE RESISTIVITY OF A MATERIAL

In the copending patent application of Edward E. Gardner et al. for "Measurement of Resistivity Profiles in Semiconductor Materials," Ser. No. 710,297, filed Mar. 4, 1968, and assigned to the same assignee as the assignee of the present application, there is described a method for determining the resistivity of a semiconductor material in accordance with the effective radius of contact of the probe, which is common to both the current source and the voltage measuring means that are utilized to ascertain the spreading resistance of a semiconductive material. As set forth in the aforesaid Gardner et al. application, the resistivity of the material is equal to four times the product of the spreading resistance and the effective radius of contact.

In order to obtain an accurate determination of the spreading resistance of the material of a specimen at various points, it is necessary that there be no nonreproducible mechanical disturbances of the specimen. If a nonreproducible mechanical disturbance exists and current is passed through the material from the current source, the voltage drop ascertained by the voltage measuring means will not be a true indication of the voltage drop at the point in the material because of any nonreproducible mechanical disturbances therein.

The present invention satisfactorily solves this problem by moving the spreading resistance probe, which is the probe common to both the current source and the voltage measuring means, into contact with the material after the other two probes have engaged the specimen and the disturbances created thereby have ceased. Thus, when the spreading resistance probe of the present invention is in engagement with the specimen, there will be no nonreproducible mechanical disturbances in the specimen due to the other two probes contacting the specimen. Accordingly, a more accurate determination of the spreading resistance of the material is obtained when the spreading resistance probe is moved into contact with the specimen after the other two probes of the three-probe apparatus have contacted the specimen.

The force with which the spreading resistance probe engages the specimen must be such that a good ohmic contact is obtained with the material. However, the force must not be such that the probe penetrates through the layer of material that is to have its spreading resistance determined. For example, if the force with which the probe engages the specimen is too great, a very thin layer of a semiconductive material would be completely penetrated by the probe so that a true reading of the spreading resistance of the thin layer of material would not be obtained. If sufficient force is not utilized, a good ohmic contact will be obtained by the spreading resistance probe so that a true determination of the spreading resistance would not be obtained.

Additionally, the force with which the spreading resistance probe engages the material to obtain good contact varies depending upon the material. Thus, the technique can be utilized to measure materials such as silicon, germanium, or gallium arsenide, for example, by varying the probe force.

The present invention satisfactorily solves the foregoing problems by providing an arrangement in which the velocity with which each of the probes engages the material is positively controlled. Accordingly, it is not necessary for the operator to have to attempt to regulate the velocity with which the probe engages the material since it is only necessary for the operator to selectively determine the force that it is desired for each of the probes to engage the material.

Thus, while good contact of the other two probes is not a requisite for satisfactory operation of the present invention because most of the voltage drop, which is used to determine the spreading resistance, occurs beneath the spreading resistance probe, the other two probes are loaded greater than the spreading resistance probe. For example, the spreading resistance probe could be set to engage silicon with a force of 15 grams and each of the other probes would be set to engage silicon with a force of 20 grams.

Additionally, since it is more difficult to obtain good contact with silicon P-type conductivity material, it is necessary that the force be sufficient to establish good contact on P-type material. As a result, there is no problem in making good contact with silicon N-type conductivity material.

Therefore, the operator may easily vary the loading up of the probes that engage the material in accordance with the material and the condition of the probe. That is, a different loading is normally required for a new probe in comparison with a probe that has been used.

As previously mentioned, it is necessary for the spreading resistance probe to have a good contact with the material being tested to determine its spreading resistance. To determine whether there is a good contact, current from the current source must be passed through the material in opposite directions. If there is good contact, the values of the two voltages will be substantially the same.

It normally is only necessary to make calibrations to determine if the spreading resistance probe makes good contact with the material when a new probe is used or a different type of material is tested. In either instance, the loading of the spreading resistance probe must be changed.

Furthermore, after it has been determined that the spreading resistance probe makes good contact with the material, the voltmeter is used during the first portion of each measuring cycle to also ascertain the magnitude of the current flowing from the current source through the material. Thus, the voltmeter is connected across the potentiometer to measure the magnitude of the current which flows through the material during each cycle in which the spreading resistance at a point on the material is determined.

Therefore, when the voltmeter is employed in the second portion of the cycle to determine the voltage drop in the material due to the current flowing therethrough, it is necessary to connect the voltmeter between the probe, which does not have any current flowing therethrough, and the spreading resistance probe. Since the spreading resistance of the material can be relatively low such as 0.001 ohm, for example, and the resistance of the wire or lead connecting the current source to the spreading resistance probe may be 2 or 3 ohms (it should be understood that the potentiometer, which is utilized to measure the current to ascertain its magnitude and to ascertain if the spreading resistance probe has a good contact, is a ganged resistor variable in steps of 10, 100, 1,000, 10,000, and 100,000 ohms.), the connection of the voltmeter so that it would include the resistance of the wire from the current source to the spreading resistance probe would result in a very misleading indication of the spreading resistance of the material.

The present invention satisfactorily solves the foregoing problem by connecting the voltmeter to the spreading resistance probe as close as possible to the contact of the spreading resistance probe to the material. Accordingly, the resistance of the wire from the current source to the spreading resistance probe is bypassed whereby the slight length of the probe assembly to which the voltmeter is connected is such that its resistance is small in comparison with the spreading resistance of the material. Thus, an accurate indication of the spreading resistance of the material is obtainable when utilizing the present invention.

It should be understood that the voltmeter employs a relatively high impedance such as 1,000M ohms, for example, to eliminate electrical loading of the specimen. Since the voltmeter impedance is in parallel with the spreading resistance of the material, the impedance of the voltmeter does not affect the value of the spreading resistance of the material when the voltmeter has a relatively high impedance in comparison with the spreading resistance of the material.

Any ambient light on the contact between the spreading resistance probe and the material or any of the junctions between layers of opposite conductivity produces a photovoltage. As a result, this photovoltage is sensed by the voltmeter in addition to the voltage drop created in the material due to the current flowing therethrough. Accordingly, this photovoltage would affect the accuracy of the determination of the spreading resistance of the material.

The present invention satisfactorily solves the foregoing problem by utilizing a cover or shield to prevent ambient light from creating a photovoltage. Since the apparatus of the present invention cannot produce any current flow unless the cover or shield is properly positioned, the probes and the specimen are disposed in a dark area when current is supplied to the specimen.

Since the measurement of the spreading resistance is normally conducted in areas in which there are high RF fields, it is necessary to reduce the effect of these RF fields. Otherwise, a portion of these various RF fields would be picked up. This would affect the accuracy of the spreading resistance determined by the three probe apparatus of the present invention. Accordingly, the cover or shield of the present invention is preferably formed of a metallic material such as steel, for example, to reduce the effect of any RF fields.

Furthermore, if the material of the specimen has a high resistivity, static charges created by the operator or other humans also can affect the determination of the spreading resistance. Accordingly, the cover of the present invention also prevents static charges of humans from affecting high resistivity specimens.

Since various types of acoustical noises can create disturbances in the specimen so as to affect the measurement of the spreading resistance in the same manner as the mechanical disturbances created by the probes contacting the specimen, it is necessary to reduce the effect of acoustical disturbances on the specimen. Since such acoustical noises would not create the same magnitude of mechanical disturbance as the probes engaging the specimen, the cover of the present invention will reduce the noise sufficiently to prevent it from affecting the specimen. Thus, the cover or shield functions as an acoustical shield.

Since it is desired to ascertain the spreading resistance of the specimen at a plurality of different points, there must be relative movement between the probes and the specimen after each determination of the spreading resistance of the material, However, such movement must not occur when the probes are in engagement with the specimen but only after the probes have been moved away from contact with the specimen. Accordingly, the present invention uses means to prevent any movement of the specimen relative to the probes when the probes are in contact with the specimen.

An object of this invention is to provide a method and apparatus utilizing three probes for determining the spreading resistance of a material in which the spreading resistance probe engages the material last.

Another object of this invention is to provide a method and apparatus utilizing three probes for determining the spreading resistance of a material in which the force with which each probe engages the material is controlled and variable.

A further object of this invention is to provide a three-probe apparatus for determining the spreading resistance of a material in which the measuring cycle is automatic after the probes and the specimen are in engagement with each other.

Still another object of this invention is to provide a three-probe apparatus for determining the spreading a resistance of a material in which a more accurate determination of the spreading resistance is obtained.

The foregoing and other objects, features, and advantages of the invention will be more apparent from the following more particular description of the preferred embodiment of the invention as illustrated in the accompanying drawings.

In the drawings:

FIG. 4 is a side elevational view, partly in section, taken at right angles to FIG. 3, and showing the hood in its open position.

FIG. 5 is a sectional view of the probe assembly taken along line 5-5 of FIG. 6 and showing the means for positioning a weight within the probe arm of the probe assembly to change the force with which the probe engages the specimen.

FIG. 6 is a sectional mounting of a probe assembly and showing the mounting of the probe in the assembly. each other

FIG. 10 is a schematic wiring diagram illustrating the automatic control system of the present invention for measuring the spreading resistance of the specimen.

FIG. 11 is a timing chart for showing the positions of various switches of the circuit FIG. 10 at various times during a measuring cycle.

Figure 1:
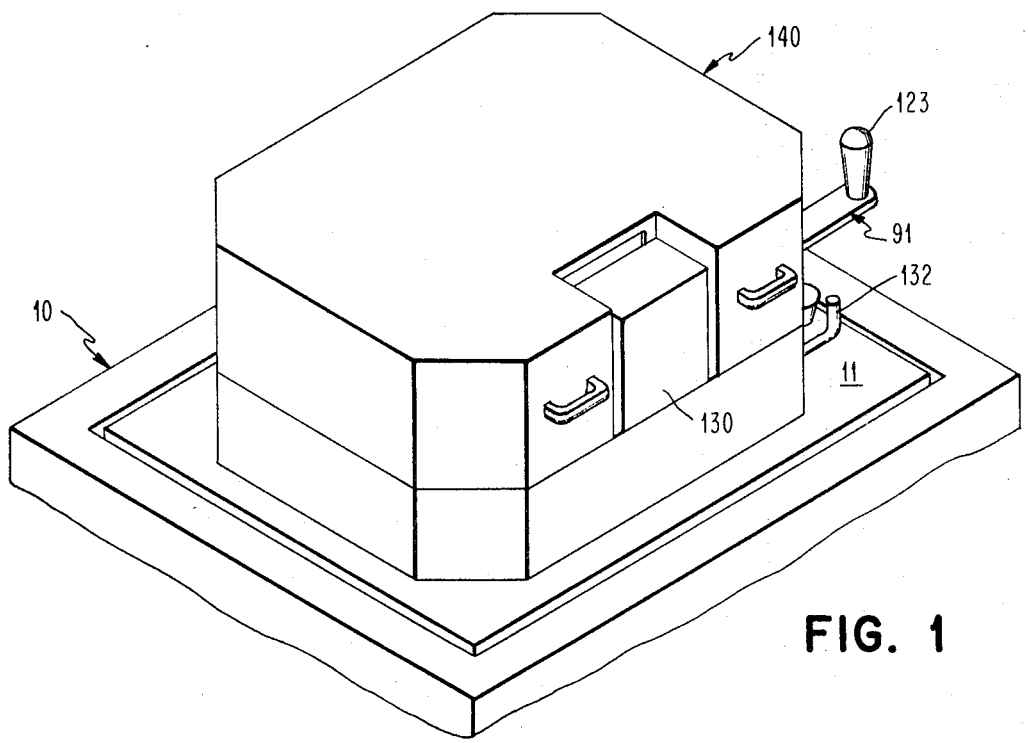
FIG. 1 is a perspective view of the three-probe apparatus of the present invention with the hood for enclosing the probes and specimen in its protective position.

In order to have a vibration free measurement of the spreading resistance of a material, it is necessary to mount the three-probe apparatus of the present invention in a vibration-free environment. Accordingly, as shown in FIG. 1, the three-probe apparatus of the present invention is supported on a vibration-free table 10. One suitable example of the vibration-free table is that sold as Model No. 40500-2 by Barry Controls, a Division of Barry Wright Corporation.

Figure 3:
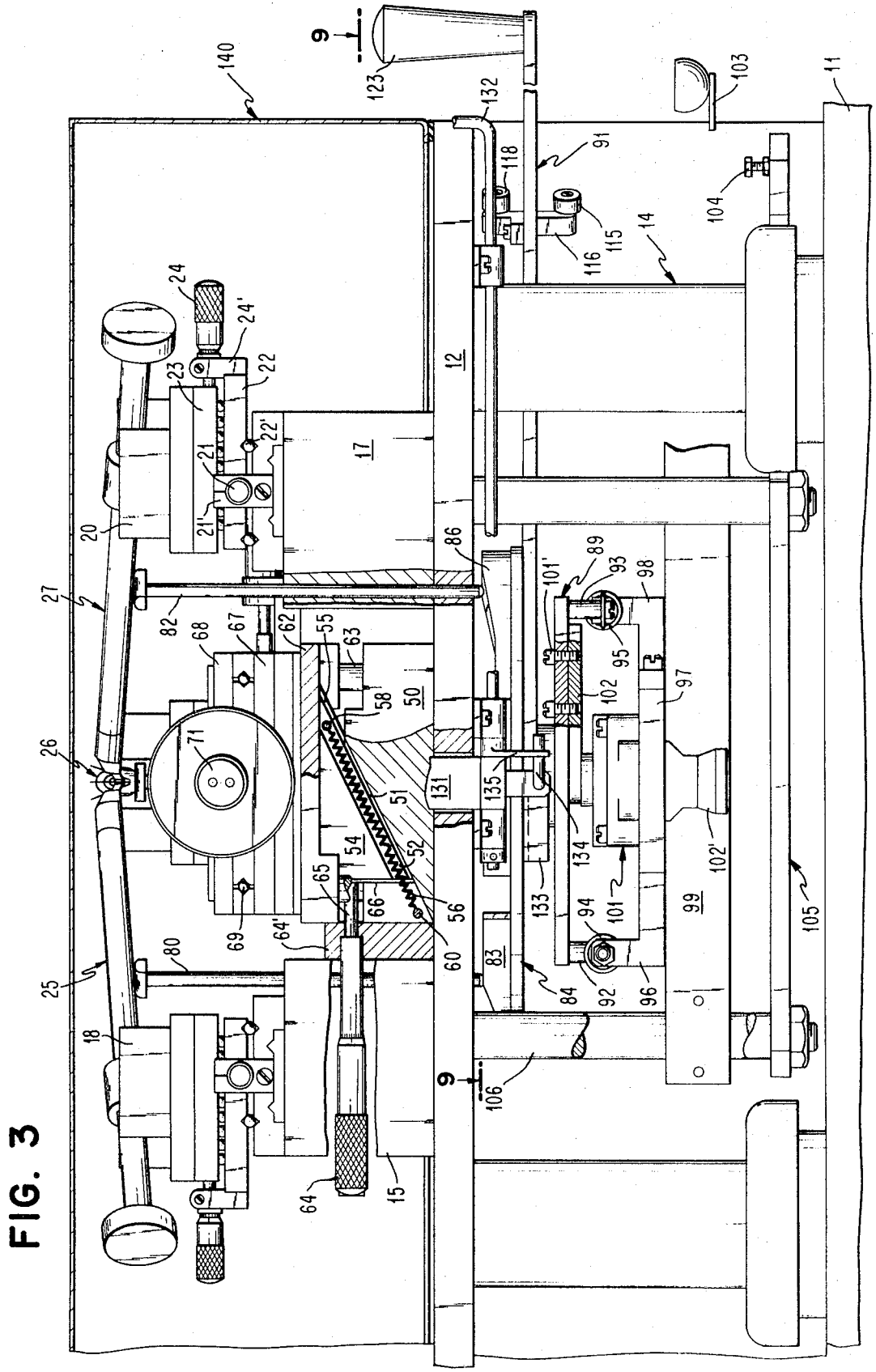
FIG. 3 is a side elevational view, partly in section, of the three-probe apparatus of the present invention with the hood in its protective position of FIG. 1.

The table 10 includes a vibration-free portion 11 (see FIG. 3). A baseplate 12 of the three-probe apparatus of the present invention is supported in spaced relation to the portion 11 of the table 10 by four posts 14, which extend upwardly from the portion 11 of the table 10.

Figure 8:
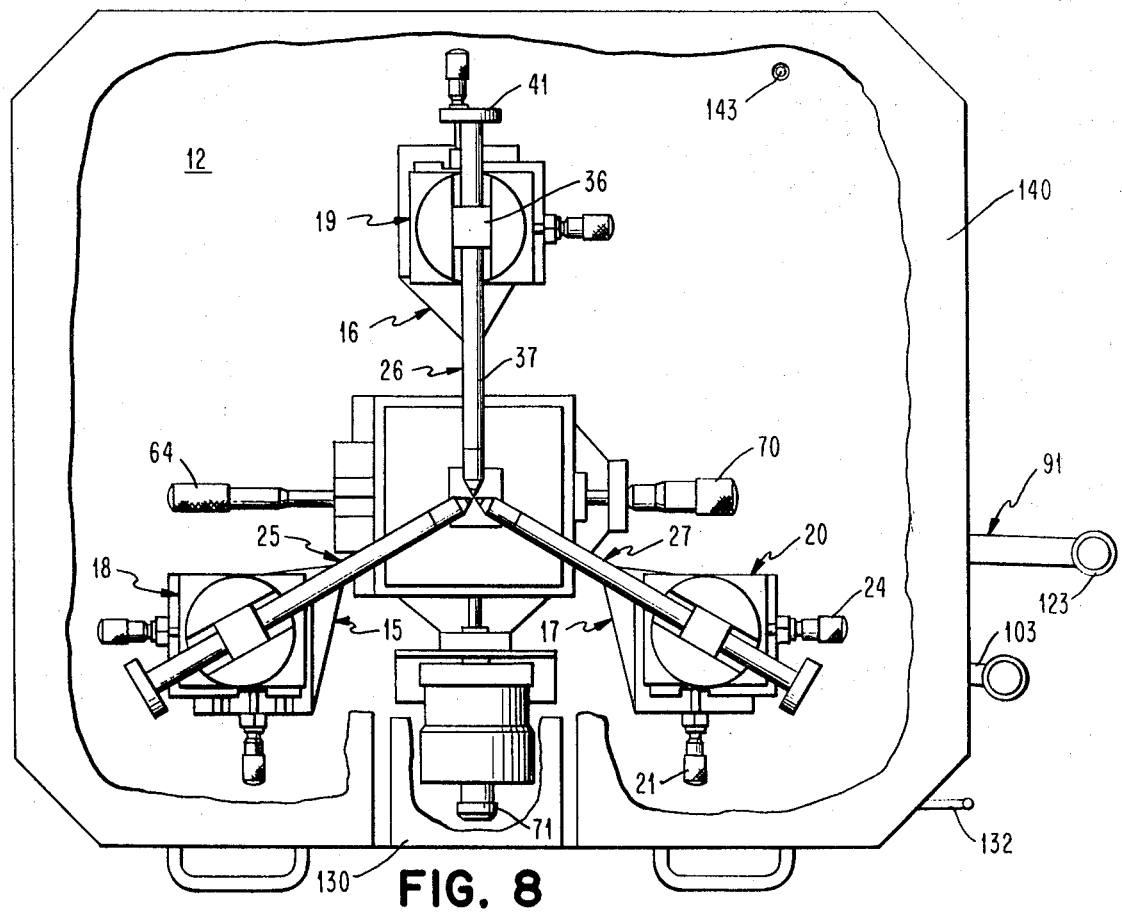
FIG. 8 is a top plan view of the three-probe apparatus of the present invention with portions of the protective hood removed for purposes of clarity.

The baseplate 12 has three mounting blocks 15, 16, and 17 (see FIGS. 3 and 4) supported on its upper surface and extending upwardly therefrom. The mounting blocks 15—17, which are equally angularly spaced from each other as shown in FIG. 8, have bearing blocks 18—20, respectively, supported thereon. Each of the bearing blocks is movable relative to its mounting block in a horizontal plane, which is parallel to the baseplate 12.

For example, the bearing block 20 may be moved relative to the mounting block 17 along a first axis through rotating a micrometer 21, which is supported on the mounting block 17 by a support 21', to cause a plate 22 to move relative to the mounting block 17. The plate 22 is mounted on bearings 22' (see FIG. 3) for sliding movement along the first axis relative to the mounting block 17.

The micrometer 21 has its shaft acting on the plate 22 so that rotation of the micrometer 21 in one direction causes movement of the plate 22 away from the support 21' along the fist axis. Rotation of the micrometer 21 in the opposite direction causes movement of the plate 22 toward the support 21' along the first axis due to springs (not shown) continuously urging the plate 22 against the shaft of the micrometer 21.

The plate 22 has a plate 23 supported thereon by bearings 23' for sliding movement along a second axis, which is at right angles to the direction of movement of the plate 22 relative to the mounting block 17. Accordingly, when a micrometer 24, which is supported on the plate 22 by a support 24' and cooperates with the plate 23 in the same manner as the micrometer 21 cooperates with the plate 22, is rotated, the plate 23 will move at right angles to the axis along which the plate 22 is moved by the micrometer 21.

It should be understood that the plate 23 is mounted on the plate 22 in a manner so that any movement of the plate 22 relative to the mounting block 17 by the micrometer 21 results in similar movement of the plate 23. Thus, while the plate 23 is movable relative to the plate 22 along an axis perpendicular to the axis along which the plate 22 moves, the plate 23 also is movable along the axis that the plate 22 moves when the plate 22 is moved by the micrometer 21.

Since the bearing block 20 is fixed to the plate 23, the bearing block 20 can move in any direction in a horizontal plane, which is parallel to the baseplate 12. This is accomplished by the micrometers 21 and 24.

Since the mounting of the bearing block 18 on the mounting block 15 and the mounting of the bearing block 19 on the mounting block 16 are the same, no further description of these relationships will be described. Of course, this arrangement permits movement of each of the bearing blocks 18 and 19 in any direction in a horizontal plane parallel to the baseplate 12.

The bearing blocks 18—20 have probe assemblies 25—27, respectively, pivotally mounted thereon. The probe assemblies 25—27 include probes 28—30, which are adapted to engage a specimen 31 with the probe 29 engaging the specimen 31 substantially perpendicular to the surface of the specimen 31. The specimen 31 is disposed on the upper surface of an assembly 32, which is supported on the baseplate 12.

Figure 2:
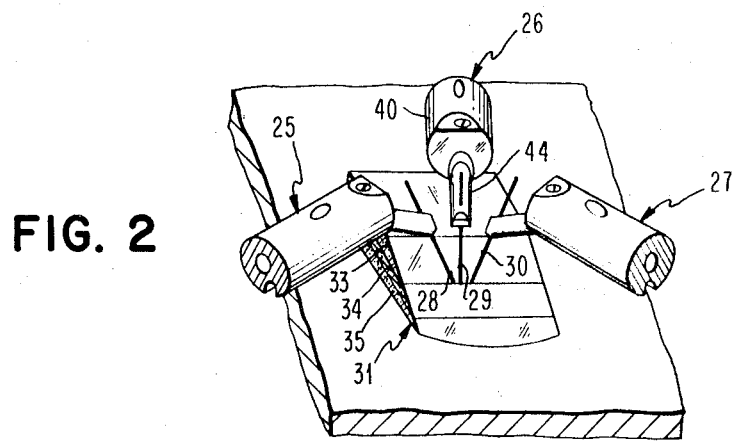
FIG. 2 is an enlarged perspective view showing the three probes in contact with a specimen having layers of different-type conductivities.

As shown in FIG. 2, the specimen 31 may be a semiconductive device having layers 33, 34, and 35 formed therein. The layers 33 and 35 could be formed of a different semiconductive material, for example, than the layer 34. Accordingly, by using the method described in the aforesaid Gardner et al. application, the junction between the layers 33 and 34 and the junction between the layers 34 and 35 may be readily discerned through measuring the spreading resistance at various points along a beveled surface of the specimen 31. The beveled surface exposes the various layers.

The probe assembly 26 is pivotally mounted on the bearing block 19 by being supported on a fulcrum 36 (see FIG. 4), which is pivotally mounted on the bearing block 19. The probe assembly 26 includes a hollow arm 37 (see FIG. 6), which is slidable within a passage in the fulcrum 36 and adjustably connected thereto by suitable means such as a setscrew 37', foe example. Thus, the position of the prior assembly 26 may be adjusted as desired. The probe assemblies 25 and 27 are pivotally mounted in the same manner through fulcrums on the bearing blocks 18 and 20, respectively.

As shown in FIGS. 5 and 6, the arm 37 has a weight 38 disposed therein and supported on a lead screw 39. The lead screw 39 has one end rotatably supported in a head 40, which is fixed to one end of the arm 37. The other end of the lead screw 39 is fixed to a knob 41 by means of a setscrew. A cap 41' which rotatably supports the knob 41 and the lead screw 39, supports the other end of the hollow arm 37.

The weight 38 is prevented from rotating with the lead screw 39 by cooperation between a longitudinal slot 42 (see FIG. 5) in the bottom of the weight 39 and a hollow tube 43, which extends between the head 40 and the cap 41'. Since the weight 38 has a threaded insert on one end thereof for cooperation with the threads on the lead screw 39, the weight 38 is moved longitudinally within the hollow arm 37 when the knob 41 is turned to rotate the lead screw 39.

Thus, rotation of the knob 41 in one direction moves the weight 38 toward the head 40 to increase the force with which the probe 29 of the probe assembly 26 engages the specimen 31. Rotation of the knob 41 in the opposite direction moves the weight 38 away from the head 40 to decrease the force with which the probe 29 engages the specimen 31.

The head 40 has an insert 44 therein in which the probe 29 is supported. The probe 29 is the portion of the probe assembly 26 that engages the specimen 31 and is formed of a suitable conductive material such as tungsten carbide, for example. The probe 29 is disposed within a passage in the insert 44 and retained therein by a setscrew.

The probe 29 is electrically connected to a wire 45, which is disposed within the hollow tube 43, since the wire 45 is soldered to the head 40 which is electrically conductive as is the insert 44. The wire 45 leads to a digital voltmeter 46 (see FIG. 10). One suitable example of the voltmeter 46 is Model 521 of Vidar Corporation.

Each of the other probe assemblies 25 and 27 is similarly formed as the probe assembly 26. Thus, the probe assembly 25 has the probe 28 engaging the specimen 31 while the probe assembly 27 has the probe 30 engaging the specimen 31. The probe 28 has a wire 47 (see FIG. 10) leading to a power supply such as DC current source 48 while the probe 30 is connected through a wire 49 to the digital voltmeter 46. One suitable example of the current source 48 is a constant current source sold by Electronic Measurements Corporation, Eatontown, N.J. as Model C624.

As previously mentioned, the specimen 31 is supported on the assembly 32. The assembly 32 includes various means to permit positioning the specimen 31 in any direction in a horizontal plane, which is parallel to the baseplate 12, and along a vertical axis, which is perpendicular to the baseplate 12. The assembly 32 includes a base 50 (see FIG. 3), which is fixed to the baseplate 12. The base 50 has an inclined surface 51 formed therein on which is mounted a pair of parallel and spaced slides (one shown at 52) with the surfaces of the slides closest to each other being tapered.

A wedge 54 is slidably mounted on the slides on the base 50 through having a slide 55 secured thereto. The slide 55 is formed with tapered edges on each side that cooperate with the tapered edges on the slides on the base 50 to form a dovetail relation therebetween. Springs 56 and 57 (see FIG. 4) are attached to the upper end of the wedge 54 by means of pins 58 and 59, respectively, The other ends of the springs 56 and 57 are attached to the base 50 by pins (one show at 60 in FIG. 3 for the spring 58). Thus, the wedge 54, which has its surface formed at the same angle as the inclined surface 51, is continuously urged downwardly along the inclined surface 51 of the base 50 by the springs 56 and 57.

A plate 62 (see FIG. 4) is mounted on vertically disposed rods 63, which slidably extend into the base 50. The plate 62 is supported on the upper, horizontal surface of the wedge 54 so that movement of the wedge 54 up the inclined surface 51 of the base 50 causes upward movement of the plate 62 with the rods 63. Likewise, downward movement of the wedge 54 along the inclined surface 51 of the base 50 results in downward movement of the plate 62 with the rods 63.

The vertical movement of the plate 62 is controlled by a micrometer 64 (see FIG. 3). When the micrometer 64, which is supported on a bracket 64' fixed to one side of the base 50, is rotated in one direction, its shaft 65 advances axially against a protuberance 66 of the wedge 54. When this occurs, the wedge 54 is moved up the inclined surface 51 of the base 50 against the force of the springs 56 and 57. Rotation of the micrometer 64 in the opposite direction moves the shaft 65 away from the protuberance 66 and results in the force of the springs 56 and 57 moving the wedge 54 down the inclined surface 51 of the base 50. Thus, precise vertical positioning of the plate 62 is obtained.

The plate 62 has a support block 67 mounted thereon by bearings 67' (see FIG. 4) for sliding movement relative to the plate 62 along a first axis in a horizontal plane parallel to the baseplate 12. A second support block 68 is slidably mounted on the first support block 67 by bearings 69 (see FIG. 3) for movement along a second axis at right angles to the first axis and in a horizontal plane parallel to the baseplate 12. Thus, when the specimen 31 is supported on the assembly 32, it may be moved vertically and in any direction in a horizontal plane. The horizontal movement (FIG. 4) is accomplished through utilizing micrometers 70 and 71 with the micrometer 70 moving the support block 67 relative to the plate 62 and the micrometer 71 moving the support block 68 relative to the support block 67.

It should be understood that springs (not shown) continuously urge each of the blocks 67 and 68 against the shafts of the micrometers 70 and 71, respectively, in the well-known manner. Additionally, the block 68 is movable along the first axis with the block 67 in the well known manner.

As a result, the specimen 31 may be positioned relative to the probes 28—30. The micrometer 71 is utilized to move the specimen 31 relative to the probes 28—30 after each determination of the spreading resistance of the material of the specimen 31 at some specific point has been completed. Thus, the micrometer 71 moves the specimen 31 in the direction parallel to the longitudinal axis of the hollow arm 37 of the probe assembly 26 to cause relative movement of the specimen 31 with respect to the probes 28—30. It should be understood that the probes 28—30 are disposed along a straight line, which is perpendicular to the direction of the movement of the specimen 31 by the micrometer 71.

The beveled surface is formed on the specimen 31 by a device so that the beveled surface is parallel to the bottom of a holder for the specimen 31. Thus, each of the specimens 31 has the same thickness so that no vertical adjustment of the assembly 32 is required when a new specimen is positioned on the assembly 32.

However, when a new spreading resistance probe is used or a wafer having a different thickness is tested, new calculations must be made by using wafers having the same resistivity throughout the wafer. When these wafers have different thicknesses, it is necessary to vertically adjust the assembly 32 to position each of the bulk wafers for engagement with the spreading resistance probe so that the surface of the wafer is in the original plane of reference.

The movement of the probes 28—30 into engagement with the specimen 31 and removal therefrom is controlled by lifter rods 80—82 (see FIGS. 3 and 4). The lifter rod 80 cooperates with the probe assembly 25, the lifter rod 81 cooperates with the probe assembly 26, and the lifter rod 82 cooperates with the probe assembly 27.

The lifter rod 80 is slidably supported in the mounting block 15 and extends beneath the baseplate 12 for engagement with a cam 83 on a cam plate 84. The lifter rod 81 is slidably mounted within the mounting block 16 and extends beneath the baseplate 12 to engage a cam 85 (see FIG. 9) on the cam plate 84. The lifter rod 82 is slidably disposed within the mounting block 17 and extends beneath the baseplate 12 for engagement at its lower end with a cam 86 on the cam plate 84.

Thus, by appropriately angularly positioning the cams 83, 85, and 86, the movement of the probes 28—30 into contact with the specimen 31 can be controlled. That is, the positions of the cams can be such that the probe 28 initially engages the specimen 31, then the probe 30 contacts the specimen 31, and finally the probe 29 engages the specimen 31. Of course, the positions of the cams 83 and 86 can be formed so that both of the probes 28 and 30 would simultaneously engage the specimen 31. It is only necessary that the probe 29, which functions as a spreading resistance probe, engage the specimen 31 after the other two probes 28 and 30 have made contact with the specimen 31.

This arrangement insures that the mechanical disturbances which are created in the specimen 31 by the probes 28 and 30 cease before the probe 29 settles. As a result, there is no effect on the contact area of the probe 29 due to disturbances in the specimen 31 from the probes 28 and 30 engaging the specimen 31.

Figure 7:
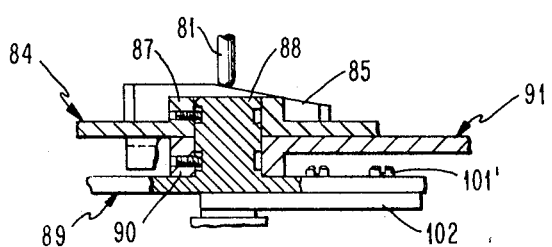
FIG. 7 is a side elevational view, taken from the same side as FIG. 3, of a portion of the apparatus and showing the mounting arrangement for the cam plate and the actuating arm.

The cam plate 84 has an annular portion 87 (see FIG. 7) of the cam plate 84 extending upwardly therefrom to receive therein a portion of a hub 88 of an arm 89. The cam plate 84 is fixed to the arm 89 for rotation therewith by suitable means such as a setscrew, for example, connecting the annular portion 87 to the hub 88. The hub 88 of the arm 89 also has an annular portion 90 of an actuating arm 91 fixed thereto by suitable means such as a setscrew, for example. Accordingly, when the actuating arm 91 is rotated, the cam plate 84 rotates due to the common connection through the hub 88 of the arm 89.

The arm 89 has its opposite ends connected by studs 92 and 93 (see FIG. 3) to one end of each of springs 94 and 95, respectively. The spring 94 has its other end connected by an eye bolt to a bracket 96, which is fixed to a mounting plate 97. The other end of the spring 95 is fixed to a bracket 98, which also is fixed to the mounting plate 97, by an eye bolt.

The mounting plate 97 is connected to a mounting bar 99 (see FIG. 9), which is fixed to two vertical rods 100 extending downwardly from the baseplate 12. Thus, the mounting plate 97 is fixed against movement so that rotation of the arm 89 by clockwise (as viewed in FIG. 9) rotation of the actuating arm 91 results in the springs 94 and 95 being loaded to exert a force on the cam plate 84 when the actuating arm 91 is released for counterclockwise rotation.

A dashpot 101 (see FIG. 3) is fixed to the mounting plate 97 and has an actuating lever 102 connected to the cam plate 84 through being secured to the arm 89 be screws 101'. The dashpot 101 must be capable of controlling two consecutive nonconstant velocity rates of the cam plate 84.

Thus, in the initial counterclockwise (as viewed in FIG. 9) rotation of the cam plate 84, a higher initial velocity is imparted while a lower velocity is imparted in the second stage of counterclockwise rotation of the cam plate 84. The velocity controlled by the dashpot 101 decreases from its initial actuation during both the high velocity stage and the low velocity stage.

One suitable example of the dashpot 101 is a rotary dashpot, which is sold by Efdyn Corporation of Chicago, Ill. as Model ARD-1. Any other suitable means that will provide the desired operating characteristics may be employed. These characteristics are that the same reproducible force is imparted to the probes 28—30 during each movement into the specimen 31 and that this force is vibration-free.

The dashpot 101 includes an adjustable knob 102' for adjusting its output. This is necessary so that each dashpot would have the same operating characteristics when using a plurality of the apparatuses of the present invention.

Since the dashpot 101 is fixed to the mounting bar 99 and the actuating lever 102 of the dashpot 101 is connected to the cam plate 84, this arrangement rotatably supports the cam plate 84. As a result of the dashpot 101, a vibration-free rotation of the cam plate 84 is obtained. Accordingly, vibrations, which would be created by a motor, for example, driving the cam plate 84, are eliminated with the foregoing arrangement.

Figure 9:
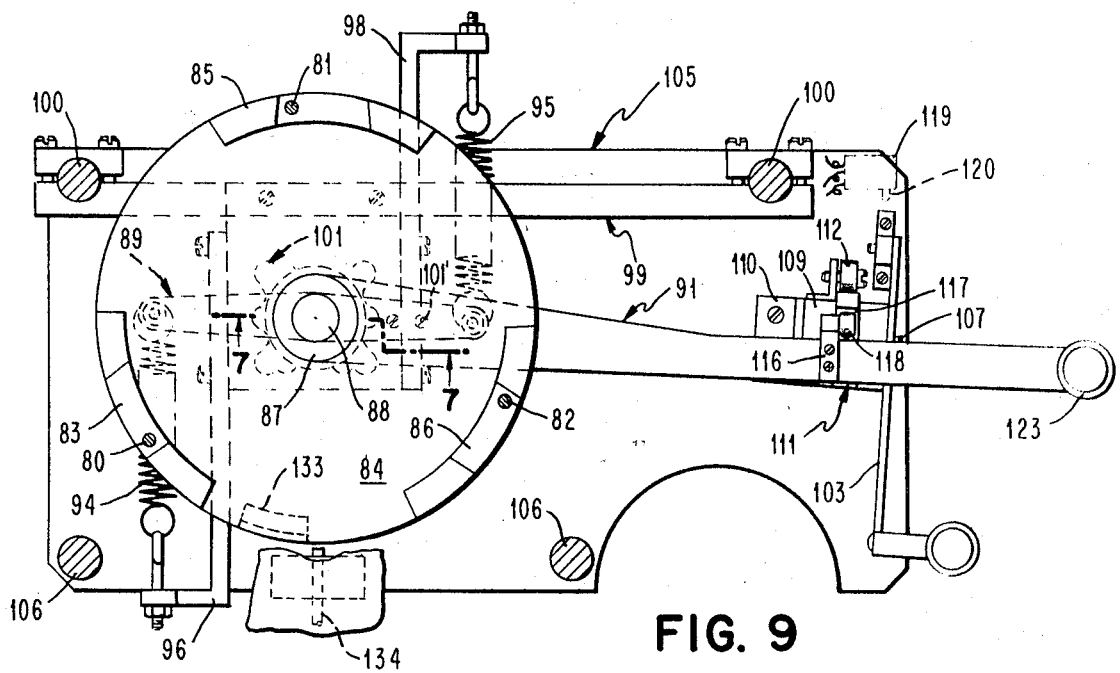
FIG. 9 is a top plan view or a portion of the three-probe apparatus of the present invention and illustrating the cam arrangement for lifting the probes into and out of engagement with the specimen and drive and latching mechanisms and taken along line 9-9 of FIG. 3.

As previously mentioned, it is necessary for the actuating arm 91 to be rotated clockwise (as viewed in FIG. 9) to load the springs 94 and 95 and the dashpot 101. This position of the actuating arm 91 is shown in FIGS. 4 and 9. In this position, the probes 28—30 are in their raised positions away from the specimen 31.

Accordingly, when it is desired to move the probes 28—30 downwardly into engagement with the specimen 31, a pivotally mounted lever 103 (see FIG. 4) is moved downwardly until it engages a stop 104 on a plate 105. The plate 105 is attached to the bottom of the baseplate 12 by vertically disposed support rods 106 and the rods 100.

When the lever 103 moves downwardly, it engages a screw 107 on a slidable member 108, which is slidably mounted within a block 109. The block 109 is secured to an L-shaped support 110, which is fixed to the plate 105. The upper end of the slidable member 108 has a latch 111 fixed thereto.

The latch 111 is continuously biased to the position of FIG. 4 by a constant force spring 112, which has its free end secured to the slidable member 108. The spring 112 is mounted on a block 113, which is adjustable with respect to the block 109 by means of screws 114. Thus, when the lever 103 is moved downwardly, the force of the spring 112 is overcome and the latch 111 is moved downwardly sufficiently so that a roller 115, which is fixed to a support 116 on the arm 91, begins to come out of recess 117 in the upper surface of the latch 111.

As a result, when the roller 115 leaves the recess 117, the springs 94 and 95 and the dashpot 101 may rotate the cam plate 84 counterclockwise (as viewed in FIG. 9) to move the probes 28—30 downwardly into engagement with the specimen 31. The force of the springs 94 and 95 is used to cause the actuating arm 91 to have the roller 115 clear the latch 111. The movement of the actuating arm 91 is controlled by the dashpot 101. This arrangement allows the operator to release the lever 103 as soon as the lever 103 engages the top 104.

The support 116 has a second d roller 118 thereon and vertically disposed above the roller 115 as shown in FIG. 4. The roller 118 rolls against the bottom surface of a plate 118' on the bottom of the baseplate 12 to insure that the actuating arm 91 moves in a plane parallel to the baseplate 12.

The movement of the arm 91 and, therefore, the cam plate 84 is stopped when the support 116 on the arm 91 engages against a microswitch housing 119. The microswitch housing 119 has a plunger 120 extending therefrom for engagement with the support 116 to cause actuation of its microswitch 121 (see FIG. 10) within the housing 119, which is supported on an angle iron 122 that is fixed to the baseplate 12. The microswitch 121 must be actuated before any of the operations of the circuit of FIG. 10 may occur. This insures that no current is supplied to the probes 28 and 29 before the probes 28—30 are in contact with the specimen 31.

When it is desired to return the actuating arm 91 to the position of FIGS. 4 and 9, an upstanding handle 123 on the end of the actuating arm 91 is grasped to move the arm 91 to the left (as viewed in FIG. 4) whereby the arm 91 rotates clockwise (as viewed in FIG. 9). When the arm 91 is moved to the left, the roller 115 engages inclined surface 123 of the latch 111 and causes the latch 111 to be moved downwardly against the force of the spring 112 until the roller 115 drops off the upper end of the inclined surface 123 into the recess 117. The movement of the actuating arm 91 to the left is stopped due to engagement with a stop 124, which is secured to the angle iron 122.

While the normal stopping position for the actuating arm 91 is against the stop 124, the stop 124 includes a first portion 125, which is fixed to the angle iron 122, and a second portion 126 hinged to the first portion. Accordingly, when the second portion 126 of the stop 124 is pivoted relative to the first portion 125, the second portion 126 is moved out of the path of the arm 91. As a result, the actuating arm 91 may continue to be moved to the left (as viewed in FIG. 4) by the operator until the arm 91 engages against a stop 127 on the angle iron 122.

This additional movement of the arm 91 to the left causes the roller 115 to ride out of the recess 117 by riding along inclined surface 128 of the latch 111 whereby the latch 111 moves downwardly against the force of the spring 112. When the arm 91 has engaged the stop 127, the latch 111 has returned to the position of FIG. 4 whereby an end surface 129 of the latch 111 engages against the roller 115. This locks the arm 91 between the stop 127 and the latch 111.

This additional movement of the arm 91 to the left from the normal position of FIG. 4 results in the probes 28—30 being lifted further away from the specimen 31. Thus, this position of the probes 28—30 is used when it is desired to load or remove one of the specimens 31 from the assembly 32.

As previously mentioned, the micrometer 71 is utilized to move the specimen 31 relative to the probes 28—30. When the probes 28—30 are in engagement with the specimen 31, it is not desired for the specimen 31 to have any movement. Accordingly, at this time, it is desired to prevent the operator from being able to move the micrometer 71.

A cover 130 partially encloses the micrometer 71 so that the operator cannot reach the micrometer 71 when the cover 130 is disposed in the position of FIG. 4. The cover 130 is fixed to a member 131, which has an operating lever 132 extending through a passage therein and connected thereto. The operating lever 132 is pivotally supported by the baseplate 12. Accordingly, whenever the lever 132 is pivoted counterclockwise (as viewed in FIG. 4), the cover 130 is removed from the position in which it prevents the operator from being able to reach the micrometer 71.

If the probes 28—30 are down, the lever 132 cannot be rotated counterclockwise because of a downwardly depending stop 133 (see FIG. 9) on the cam plate 84. When the probes 28—30 are engaging the specimen 31, the stop 133 is aligned with a rod 134, which is connected by a link 135 to the lever 132. Thus, the rod 134 would engage the stop 133 to prevent the cover 130 from being moved to the position in which the operator can reach the micrometer 71 when the probes 28—30 are down.

However, whenever the probes 28—30 are up, the stop 133 is no longer aligned with the rod 134 but has been rotated out of alignment therewith. As a result, the lever 132 may be pivoted counterclockwise to remove the cover 130 from the position of FIG. 4 and allow the operator to reach the micrometer 71 to move the specimen 31.

If the cover 130 is in the position in which the micrometer 71 is exposed, the rod 134 is moved inwardly from the position of FIG. 4. As a result, this prevents the cam plate 84 from being rotated sufficiently to move the probes 28—30 downwardly due to engagement of the stop 133 on the cam plate 84 with the rod 134.

Since the ambient light can affect the determination of the spreading resistance of the material of the specimen 31 due to creation of a photovoltage at the junctions of the layers of the material of the specimen 31 and the contact of the probe 29 with the specimen 31, it is desirable to mount the specimen 31 and the probes 28—30 within a dark area during measuring. Accordingly, a hood 140, which functions as a cover or shield, is pivotally connected to the baseplate 12 by a hinge 141 whereby the hood 140 may be moved from the position of FIG. 1 in which the hood 140 completely encloses the probes 28—30 and the specimen 31 to the position of FIG. 4 in which the probes 28—30 and the specimen 31 are exposed.

The hood 140 has an adjustable actuating screw 142 thereon for cooperation with a plunger 143 of a microswitch 144 (see FIG. 10), which is supported on the baseplate 12. The plunger 143 is moved only when the hood 140 is closed. It is necessary for the microswitch 144 to be actuated along with the microswitch 121 for the circuit of FIG. 10 to be energized to cause current to be supplied to the specimen 31.

The hood 140 is preferably formed of a metal so as to attenuate any RF fields within the area in which the measuring of the specimen 31 is occurring. Thus, the hood 140 is preferably formed of sheet steel.

Additionally, the hood 140 functions to reduce the effect of any acoustical noise within the area on the measurements of the spreading resistance of the specimen 31. Thus, the hood 140 serves a plurality of functions to produce a more accurate determination of the spreading resistance of the material of the specimen 31 by the apparatus of the present invention.

Referring to FIG. 10, there is shown the circuit that is utilized to control automatically the flow of current to the specimen 31 and the measurement of the voltage drop in the material of the specimen 31 due to the current flowing therethrough. When the plunger 120 of the microswitch 121 is moved by the support 116 of the actuating arm 91, the microswitch 121 is moved from engagement with a contact 150, as shown in FIG. 10, and into engagement with a contact 151.

When this occurs, an AC power supply 152 is no longer connected to an AC relay 153. As a result, the relay 153 is deenergized. The deenergization of the relay 153 moves a contact 154 of the relay 153 to an open position and a contact 155 of the relay 153 into engagement with a contact 155'.

During the time that the microswitch 121 connects the contact 150 to the power supply 152 through a wire 156, a capacitor 157 is charged through a blocking diode 157' and a resistor 158. Thus, when the relay 153 deenergized, a DC relay 159 is energized by the charge on the capacitor 157 through the contact 155 of the relay 153 engaging the contact 155' and the microswitch 121 engaging the contact 151.

The relay 159 is energized for only the short period of time during which the capacitor 157 discharges therethrough. Thereafter, the relay 159 becomes deenergized because the resistor 158 has sufficient resistance to limit the current flow from the power supply 152 to prevent the relay 159 from remaining energized. As an example, the resistor 158 may be 50K ohms and the capacitor 157 may be 30 microfarads.

When the relay 159 is energized, a switch 161 is mechanically moved into engagement with a contact 162 to connect the power supply 152 with a timing motor 163 if the microswitch 144 is engaging a contact 164, which is connected to the contact 162 by a wire 165, and a manually operated switch 166 is in the position of FIG. 10. The microswitch 144 engages the contact 164 only when the actuating screw 142 of the hood 140 is engaging the plunger 143 of the microswitch 144. This occurs only when the specimen 31 and the probes 28—30 are in a dark area due to the hood 140 enclosing them. Thus, as previously mentioned, the hood 140 must be in its closed position to supply current to the specimen 31.

The manual switch 166 is employed only when it is desired to interrupt one of the automatic timing cycles. Thus, it is normally disposed in the position of FIG. 10.

The timing motor 163 has a shaft connected thereto with cams 167—175 mounted thereon for simultaneous rotation therewith. Each of the cams 167—175 cooperates with a switch to change the connections of various portions of the circuit.

One suitable example of the timing motor 163, the cams, and the relays is sold as Model RC-1 by Industrial Timer Corporation of Parsippany, N.J. This apparatus includes the mechanical connection between the relay 159 and the switch 161 to initially cause the switch 161 to engage the contact 162 prior to the switch 161 being maintained in this position by the cam 167 as the timing motor 163 rotates. Thus, with this arrangement, the relay 159 may be energized momentarily to cause the switch 161 to engage the contact 162, and the timing motor 163 is then retained energized due to the cam 167 cooperating with the switch 161 in such a manner as to maintain the switch 161 in engagement with the contact 162 for the length of the cycle during which the determination of the spreading resistance of the specimen 31 at one point is made. Accordingly, when the cam 167 ceases to hold the switch 161 in engagement with the contact 162, a cycle for determining the spreading resistance at one point by ascertaining the current through the material and the voltage drop due to the current flow is completed.

When the timing motor 163 starts to rotate, the cam 173 positions a switch 176 so that it engages an open contact 177 whereby the current from the current source 48 is not short-circuited through a path including wires 178 and 179, the switch 176, contact 180, wire 181, and wire 182. The wire 182 is connected to the negative side of the DC current source 48 while the wire 178 is connected to the positive side.

Whenever the relay 153 is energized, the switch 154 is in engagement with a contact 183, which is connected to the wire 182. Since the switch 154 is connected to the lead 178, this provides a short circuit path for the current source 48 whenever the timing motor 163 is not energized. This is when there is no engagement of the probes 28—30 with the specimen 31. A second short circuit path is provided through the switch 176.

When the motor 163 starts to rotate, the cam 173 moves the switch 176 into engagement with the open contact 177 to no longer provide a short circuit for the current source 48. Accordingly, current will flow from the current source 48 through the wire 178 to a switch 184, which is controlled by the cam 174, and then to one of the probes 28 and 29 depending upon whether the switch 184 is in engagement with a contact 185 or a contact 186. It will be assumed that the switch 184 is in engagement with the contact 186 when the timing motor 163 starts to rotate. This is shown in the timing chart of FIG. 11 wherein the switch 184 is shown in the position in which it is not lifted by cam 174.

Thus, current from the current source 48 flows from the switch 184 through the contact 186 and a potentiometer 187, which has various known resistances so that the operator may know the specific resistance of the potentiometer 187. The potentiometer 187 is preferably a ganged resistor settable in steps at resistances of 10 ohms, 100 ohms, 1,000 ohms, 10,000 ohms, and 100,000 ohms. The potentiometer 187 is in a wire 188, which is connected to the probe assembly 26.

While the wire 188 is shown schematically in FIG. 10 as being connected directly to the wire 45, it should be understood that the wire 188 is connected to the fulcrum for the probe assembly 26 by the setscrew 37' (see FIG. 4). Thus, the wire 188 is connected to the hollow arm 37 through the setscrew 37' as the setscrew 37' holds the arm 37 in the fulcrum 36. Since the entire probe assembly 26 is conductive during the application of current from the current source 48, the current will flow from the wire 188 through the hollow arm 37 to the head 40. Since the head 40 is connected to the probe 29 by the insert 44, there is an electrical path to the probe 29 from the wire 188.

At the time that the switch 184 is in engagement with the contact 186, a switch 190, which is controlled by the cam 175, is in engagement with a contact 191, which is connected to the wire 47. The wire 47 is connected to the probe 28 in the same manner as the wire 45 is connected to the probe 29. As shown in the timing chart of FIG. 11, the switch 190 is not raised by the cam 175 when the switch 184 is not raised by the cam 174. Thus, both of the switches 184 and 190 are moved simultaneously to cause reversal to the current through the specimen 31. A wire 192 connects the contact 185 to the wire 47 for current flow from the positive side of the current source 48 to the probe 28 when current flow through the specimen 31 is reversed. However, at the start of the operation of the timing motor 163, the switch 184 engages the contact 186 and the switch 190 engages the contact 191.

When the timing motor 163 starts to initially rotate, the cam 172 positions a switch 193, which it controls, in engagement with a contact 194. Since the switch 193 is connected to the digital voltmeter 46 and the contact 194 is connected to the wire 188 by a wire 195, one side of the digital voltmeter 46 is connected to one side of the potentiometer 187 when initial rotation of the timing motor 163 starts.

At this same time, a switch 196, which is controlled by the cam 171, is disposed in engagement with a contact 197. The contact 197 is connected by a wire 198 to the wire 188 on the opposite side of the potentiometer 187 from the connection of the wire 195.

Accordingly, the voltage drop across the potentiometer 187 is readable on the digital voltmeter 46 when the current flows from the current source 48 through the potentiometer 187 in the direction determined by the switch 184 engaging the contact 186 and the switch 190 engaging the contact 191.

However, the digital voltmeter 46 is inhibited from receiving any signals from the voltage drop across the potentiometer 187 at this time. This is accomplished through the cam 170 holding a switch 199 in engagement with a contact 200 whereby the digital voltmeter 46 is inhibited from receiving any signals from any source. The switch 199 is connected to ground.

During the time when the switch 184 engages the contact 186 and the switch 190 engages the contact 191, the cam 170 rotates to a position in which the switch 199 is moved into engagement with a contact 201. When this occurs, the digital voltmeter 46 is triggered to allow it to be connected across the potentiometer 187 and measure the voltage drop thereacross.

At this time, a coupler 202, which connects the digital voltmeter 46 to a card punch 203, is inhibited by the cam 169 causing a switch 204, which is controlled by the cam 169, to be lifted into engagement with an open contact 205. As a result, the coupler 202 is inactivated from the start of the cycle of the timing motor 163 as indicated by the position of the switch 204 in the timing chart of FIG. 11.

The inhibiting of the coupler 202 during the time that the voltmeter 46 is triggered insures that electrical noises generated by the card punch 203 do not affect the reading by the digital voltmeter 46. Thus, a more accurate determination of the spreading resistance of the specimen 31 can be obtained.

After the switch 199 has been held in engagement with the contact 201 for a predetermined period of time during which the voltage drop across the potentiometer 187 is read by the digital voltmeter 46, which displays this voltage on an indicator (not shown), the cam 170 moves the switch 199 into engagement with the contact 200 to again inhibit the digital voltmeter 46 whereby no further reading of the voltage drop across the potentiometer 187 can be obtained at this time.

At the same time that the switch 199 moves into engagement with the contact 200, the cam 169 moves the switch 204 from engagement with the open contact 205 to a contact 206, which is connected to the coupler 202. Since the switch 204 is connected to ground within the coupler 202, the connection of the switch 204 with the contact 206 causes activation of the coupler 202 whereby the reading on the digital voltmeter 46 is transferred to the card punch 203 to cause a card to have the voltage, which has been read by the digital voltmeter 46, to be registered thereon by the card punch 203 punching the card in the well-known manner.

At the same time that the switch 204 is moved into engagement with the contact 206 by the cam 169, the cam 173 moves the switch 176 into engagement with the contact 180. This short circuits the current source 48 and prevents any further current flow through the potentiometer 187.

After a short period of time, the switch 204 is moved by the cam 169 away from engagement with the contact 206 and into engagement with the open contact 205 as shown in the timing chart of FIG. 11. Thus, there is only a short period of time during which the coupler 202 connects the digital voltmeter 46 to the card punch 203. However, this is sufficient to transfer the voltage on the digital voltmeter 46.

At the same time that the switch 204 is moved into engagement with the open contact 205, the switch 184 is moved by the cam 174 from engagement with the switch 186 and into engagement with the switch 185, and the switch 190 is moved by the cam 175 from engagement with the contact 191 into engagement with a contact 207, which is connected to the wire 188. As a result, the direction of current flow through the potentiometer 187 is reversed.

During the time that the direction of current flow through the potentiometer 187 is reversed, the cam 173 maintains the switch 176 in engagement with the contact 180 to continue to short circuit the current source 48. Thus, the switch 176 is not returned into engagement with the open contact 177 by the cam 173 until a predetermined time period after the current flow through the potentiometer 187 and the specimen 31 has been reversed.

After the current flow through the potentiometer 187 and the specimen 31 has been reversed due to changing the position of the switches 184 and 190, the switch 176 is again engaged with the open contact 177 as shown in the timing chart of FIG. 11. Then, the switch 199 is moved by the cam 170 into engagement with the contact 201 to again trigger the digital voltmeter 46. Thus, the voltage drop across the potentiometer 187 due to the flow of current therethrough in the opposite direction is now displayed on the indicating means of the digital voltmeter 46.

The voltage drop at this time must be substantially the same voltage drop as that occurring when the flow through the potentiometer 187 was in the opposite direction. This is necessary to insure that there is a good contact. If there is not good contact, the cycle would not produce the desired indication of the spreading resistance of the specimen 31. This cycle would then be of no value.

It should be understood that the determination of a good contact by the spreading resistance probe 29 is only necessary when a new probe is mounted in the probe assembly 26. Once the desired force with which the new spreading resistance probe is to engage the specimen 31 has been made by adjusting the weight 38 of the probe assembly 26, it is not necessary to make further adjustment since good contact with the specimen 31 will always occur until the probe breaks or the specimen 31 is formed of a completely different material such as changing the material of the specimen from silicon to germanium, for example.

If the material were changed from silicon to germanium, it would be necessary to reduce the force substantially because the germanium is much softer and the force for penetrating silicon would pass completely through a layer of the germanium. This new force would be selected to insure that it produces a good contact of the spreading resistance probe with the specimen 31.

At the completion of the reading of the voltage drop across the potentiometer 187 by the digital voltmeter 46, the switch 199 is again moved by the cam 170 into engagement with the contact 200 to again inhibit the voltmeter 46. At the same time, the switch 204 is moved by the cam 169 into engagement with the contact 206 to trigger the coupler 202 and transfer the voltage reading on the digital voltmeter 46 to the card punch 203.

At the same time that the switch 204 is moved by the cam 169 into engagement with the contact 206, the switch 176 is moved into engagement with the contact 180 by the cam 173. This again short circuits the current source 48 and stops current flow through the potentiometer 187.

Upon completion of the time period during which the coupler 202 connects the voltmeter 46 to the card punch 203, the cam 169 again causes the switch 204 to move from the contact 206 to the open contact 205. At this same time, the switch 184 is moved by the cam 174 from engagement with the contact 185 and into engagement with the contact 186, and the switch 190 is moved by the cam 175 from engagement with the contact 207 and into engagement with the contact 191. Thus, the direction of current from the current source 48 is again reversed when the switch 176 is in engagement with the contact 180.

At the same time that the switches 184 and 190 are moved by the cams 174 and 175, respectively, the switch 193 is moved by the cam 172 from engagement with the contact 194 and into engagement with a contact 208, which is connected to the wire 45. At the same time that the switch 193 is moved, the switch 196 is moved by the cam 171 from engagement with the contact 197 and into engagement with a contact 209, which is connected to the wire 49 that is connected to the probe 30. When the switches 193 and 196 change positions, the digital voltmeter 46 is connected to the probe 29 and to the probe 30. This connection bypasses both the potentiometer 187 and the resistance of the wire 188.

Accordingly, when the switches 193 and 196 are moved into engagement with the contacts 208 and 209, respectively, the digital voltmeter 46 can sense the voltage drop within the material of the specimen 31 due to current flowing therethrough between the probes 28 and 29. Of course, the voltmeter 46 must be triggered.

When the cam 173 again moves the switch 176 from engagement with the contact 180 and into engagement with the open contact 177, current can flow in one direction through the specimen 31 due to current flowing through the wires 188 and 47. After the current has been flowing for a predetermined period of time, the digital voltmeter 46 is triggered by means of the cam 170 moving the switch 199 into engagement with the contact 201. At this time, the coupler 202 is inhibited as shown in the timing chart of FIG. 11.

During the time that the digital voltmeter 46 is triggered, there is sensing of the voltage drop at the point of the material of the specimen 31 that has the spreading resistance probe 29 in contact therewith. Since most of the voltage drop occurs under the spreading resistance probe 29, it is only necessary to position the probe 30 a distance greater than 10 effective radii of the contact of the probe 29 from the spreading resistance probe 29 to obtain the correct voltage drop. This is because approximately 99 percent of the voltage drop in the specimen 31 due to current flowing between the probes 28 and 29 occurs beneath the spreading resistance probe 29.

After a predetermined period, the voltmeter 46 is deenergized by the cam 170 moving the switch 199 into engagement with the contact 20. and away from engagement with the contact 201. At the same time, the cam 169 moves the switch 204 into engagement with the contact 206 to trigger the coupler 202 and transfer the reading on the digital voltmeter 46 to the card punch 203.

At the same time that the cam 169 moves the switch 204 into engagement with the contact 206, the cam 173 moves the switch 176 into engagement with the contact 180 to short circuit the current source 48. The switch 176 will remain in engagement with the contact 180 until after the cam 174 has moved the switch 184 from engagement with the contact 186 and into engagement with the contact 185 and the cam 175 has moved the switch 190 from engagement with the contact 191 and into engagement with the contact 207. This changing of the positions of the switches 184 and 190 causes the direction of flow of current through the specimen 31 to be reversed.

At the same time that the switch 204 is moved away from engagement with the contact 206 to inactivate the coupler 202, the cams 174 and 175 move the switches 184 and 190, respectively, to reverse the direction of flow of current through the specimen 31. Thus, when the switch 176 is again moved by the cam 173 into engagement with the open contact 177 to cease short circuiting the current source 48, current flows in the opposite direction through the specimen 31.

During the time that the switch 184 is in engagement with the contact 185 and the switch 190 is in engagement with the contact 207, the digital voltmeter 46 is energized by the cam 170 moving the switch 199 into engagement with the contact 201. At this time, the coupler 202 in inhibited since it has been inhibited from the time that the direction of current flow was reversed.

After the predetermined period of time during which the voltmeter 46 is activated, the cam 170 moves the switch 199 into engagement with the contact 200 to inhibit the voltmeter 46. At this time, the switch 204 is moved into engagement with the contact 206 to energize the coupler 202 to transfer the reading of the voltmeter 46 to the card punch 203.

At the completion of the transfer of the voltage on the voltmeter 46 to the card punch 203, the cam 167 moves the switch 161 away from engagement with the contact 162 and into engagement with an open contact 210. As a result, the motor 163 is immediately deenergized since the circuit to the power supply 152 is broken.

At the time of stopping rotation of the motor 163 (This occurs after deenergization due to momentum of the motor 163.), the cam 174 will have positioned the switch 184 in engagement with the contact 186 and the dam 175 will have positioned the switch 190 in engagement with the contact 191. Likewise, prior to completion of the cycle and at the time when the timing motor 163 is deenergized, the cam 173 will have again moved the switch 176 into engagement with the switch 180 to short circuit the current source 48.

At the completion of the cycle when the timing motor 163 is deenergized, the coupler 202 is again inhibited by the cam 169 connecting the switch 204 to the open contact 205. Thus, there is no connection between the voltmeter 46 and the card punch 203 during the time when the timing motor 163 is not activated.

During the time that the probes 28—30 are in engagement with the specimen 31 so that the microswitch 121 engages the contact 151, the current flow through the DC relay 159 is not sufficient to again energize it because of the value of the resistance of the resistor 158. However, because of the current flowing through the relay 159, the capacitor 157 cannot be charged with the probes 28—30 are down. Thus, the capacitor 157 can only be charged when the probes 28—30 are up.

Whenever the timing motor 163 is rotating, lamps 211 and 212 are alternately energized due to movement of a switch 213 by the cam 168. Thus, when the switch 213 is in engagement with a contact 214, the lamp 211 is energized while the lamp 212 is energized when the switch 213 engages a contact 215. This alternate movement of the switch 213 is shown in the timing chart of FIG. 11.

As previously mentioned, the switch 166 may be manually moved to stop the cycle at any time by deenergizing the timing motor 163 through moving the switch 166 away from engagement with a contact 216 and into engagement with a contact 217. However, when the switch 166 is returned into engagement with the contact 216, the timing motor 163 is again energized and the cycle continues from the point at which it was interrupted. The primary purpose for interrupting the cycle would be to attempt to obtain from the current source 48, by changing the output of the current source 48, the desired current level in units of one or 10 for each substantial change in the spreading resistance of the specimen 31. It is desired to have the current level in units of one or 10 to simplify the calculations for determining the spreading resistance of the material. It should be understood that the spreading resistance could have a substantial change in a single layer of conductivity or when the probe moves from a layer of one conductivity to a layer of another conductivity.

A lamp 218 is connected in parallel with the AC power supply 152 to indicate whenever the power supply 152 is on. Thus, the operator can readily ascertain whether power is being supplied to the circuit of the present invention.

Considering the operation of the present invention, the probes 28—30 must be in an elevated position when it is desired to load one of the specimens 31 on the assembly 32. Thus, the second portion 126 of the stop 124 must be pivoted out of the position of FIG. 4 so that it does not block the movement of the actuating arm 91 to the left whereby the roller 115 may be held against the end surface 129 of the latch 111. The springs 94 and 95 urge the roller 115 against the end surface 129. In this position, the probe assemblies 25—27 are moved sufficiently away from the assembly 32 so that the specimen 31 may be easily removed from or placed on the assembly 32.

After the specimen 31 has been disposed on the assembly 32, the lever 103 is moved downwardly to pull the latch 111 downwardly and allow the arm 91 to be moved to the right by the force of the springs 94 and 95.

This first movement of the lever 103 downwardly results in the arm 91 being positioned as shown in FIG. 4 wherein the roller 115 is disposed within the recess 117 of the latch 111. The vertical wall of the recess 117 serves as a stop at this time to prevent continued movement of the arm 91 to the right.

When the specimen 31 has been loaded on the assembly 32, the assembly 32 will be positioned in the horizontal plane by the micrometers 70 and 71. The vertical position of the specimen 31 must be such that the probes 28—30 can engage the specimen 31, and this will be the same as for the prior specimen 31.

Each of the probe assemblies 25—27 has its weight positioned to provide the desired loading force of each of the probes 28, 29, and 30 when it engages the specimen 31. The weights are positioned so that the probes 28—30 will penetrate the silicon P-type conductivity material, which is more difficult to make good contact with than the silicon N-type conductivity material. This positioning of the weights occurs only when a new spreading resistance probe is employed or the specimen 31 is formed of a different material such as germanium rather than silicon, for example.

The probes 28 and 30 are preferably loaded more than the spreading resistance probe 29. This insures that both the probes 28 and 30 have a good contact with the material although only the spreading resistance probe 29 must have a good ohmic contact. This is because approximately 99 percent of the voltage drop occurs underneath the spreading resistance probe.

With the probe assemblies 25—27 properly loaded to provide the desired engaging force of each of the probes 28—30 with the specimen 31, downward movement of the lever 103 allows the arm 91 to move to the right in FIG. 4 since the roller 115 is no longer retained within the recess 117 in the latch 111. The springs 94 and 95 produce the initial momentum to the arm 91 to remove it from the latch 111. The movement of the arm 91 to the right is governed and controlled by the dashpot 101. The dashpot 101 in combination with the springs 94 and 95 initially move the arm 91 at a fast rate and then move the arm 91 at a slower rate. Each of these rates is a nonconsistent and decreasing rate.

During the movement of the arm 91 to the right in FIG. 4, the cam plate 84 rotates counterclockwise (as viewed in FIG. 9) to cause the lifter rods 80—82 to move downwardly. As a result, the probe assemblies 25—27 move the probes 28, 29, and 30 toward the specimen 31. The position of the pivot of each of the probe assemblies 25—27 and the location of the weight in each of the probe assemblies 25—27 determines the force with which each of the probes 28, 29 and 30 engages the specimen 31.

As previously mentioned, it is desired for the spreading resistance probe 29 to engage the specimen 31 last. Accordingly, after the spreading resistance probe 29 has engaged the specimen 31, the arm 91 engages the plunger 120 of the microswitch 121. This occurs approximately 5 seconds after the spreading resistance probe 29 has engaged the specimen 31.

This arrangement insures that there is a time delay before any determination of the spreading resistance of the specimen 31 is obtained. This allows sufficient time for the spreading resistance probe 29 to settle. By allowing sufficient time for the spreading resistance probe 29 to settle during each cycle, there is no vibration error in the readings.

When the plunger 120 of the microswitch 121 is engaged by the arm 91, the microswitch 121 is moved from engagement with the contact 150 and into engagement with the contact 151. As a result, the timing motor 163 is energized if the microswitch 144 is in engagement with the contact 164. This occurs when the hood 140 has been moved to its closed position whereby the probe assemblies 25—27 and the specimen 31 are in a dark area. Thus, the hood 140 should be positioned in its closed position before the lever 103 is moved downwardly to release the roller 115 from the recess 117 in the latch 111.

It should be understood that the cover 130 for the micrometer 71 must be disposed in the closed position of FIG. 4 in order for the cam plate 84 to be rotatable. If the cover 130 should be in an open position, then the arm 91 cannot move to the right when the lever 103 is moved downwardly because of the blocking relation between the rod 134 and the stop 133 on the cam plate 84.

When the microswitch 121 (see FIG. 10) moves into engagement with the contact 151, the timing motor 163 starts to rotate immediately because the DC relay 159 is energized very rapidly by the discharge of the capacitor 157. The energizing of the relay 159 causes the mechanical connection between the relay 159 and the switch 161 to move the switch 161 into engagement with the contact 162 to energize the timing motor 163.

When the timing motor 163 is energized, the current from the current source 48 flows through the potentiometer 187 in one direction and the voltmeter 46 reads this voltage drop across the potentiometer 187 when the switch 199 is in engagement with the contact 201 to trigger the voltmeter 46. At this time, the coupler 202 is inhibited so that no electrical noises from the card punch 203 can be transmitted to the voltmeter 46.

After the voltmeter 46 has read the voltage drop across the potentiometer 187, the voltmeter 46 is inhibited from receiving further signals by the cam 170 moving the switch 199 into engagement with the contact 200. At this same time, the coupler 202 is triggered to transmit the voltage on the voltmeter 46 to the card punch 203.

When the voltmeter 46 is inhibited and the coupler 202 is activated, the current source 48 is short circuited by the switch 176. When the coupler 202 is deenergized, the flow of the current through the potentiometer 187 is reversed by the cams 174 and 175 changing the positions of the switches 184 and 190, respectively.

After the switches 184 and 190 have had their positions changed to produce a reverse in the current flow through the potentiometer 187, the short circuit, which is created by the position of the switch 176, ceases to exist through the position of the switch 176 being changed. Then, the voltmeter 46 is again triggered, and the voltage drop across the potentiometer 187 is again read by the voltmeter 46.

It should be understood that these two readings of the voltage from the voltmeter 46 are averaged to determine the value of the current that flows through the specimen 31. A current with this same magnitude will flow through the specimen 31 when the voltmeter 46 is connected to the probes 29 and 30 rather than across the potentiometer 187.

After the voltmeter 46 has read the second voltage drop across the potentiometer 187, the voltmeter 46 is deenergized and the coupler 202 is simultaneously triggered. At the same time that the coupler 202 is triggered, the switch 176 is moved by the cam 173 to again short circuit the current source 48.

After the coupler 202 has transmitted the voltage on the voltmeter 46 to the card punch 203, the coupler 202 is deenergized. At the same time that the coupler 202 is inactivated, the switches 184 and 190 again have their positions changed to direct the current flow through the probes 28 and 29 in the same direction as during the first part of the cycle.

At the same time that the direction of the current through the specimen 31 is reversed, the voltmeter 46 is connected to the wires 45 and 49 rather than across the potentiometer 187. This connects the voltmeter 46 to read the voltage drop in the material of the specimen 31.

Upon the switch 176 being moved by the cam 173 into engagement with the open contact 177, the current source 48 is no longer short circuited. As a result, current flows through the specimen 31 from the probe 29 to the probe 28. With the current flowing in this direction, the voltmeter 46 is triggered and the voltage drop between the probes 29 and 30 is read by the voltmeter 46. As previously mentioned, approximately 99 percent of the voltage drop occurs within 10 effective radii of the spreading resistance probe 29. Thus, it is only necessary for the probe 30 to be positioned from the spreading resistance probe 29 a distance greater than 10 effective radii of the spreading resistance probe 29.

Upon completion of the reading by the voltmeter 46, the voltmeter 46 is again deenergized by the cam 170 moving the switch 199 into engagement with the contact 200. At the same time that the voltmeter 46 is deenergized, the coupler 202 is triggered to transmit the voltage reading from the voltmeter 46 to the card punch 203.

After a predetermined period of time, the coupler 202 is deenergized and the switch 176 again short circuits the current source 48. Then, the positions of the switches 184 and 190 are again changed to cause the current to flow from the probe 28 to the probe 29; this is in the opposite direction to that in which the current passed through the specimen 31 in the previous portion of the cycle.

After the switches 184 and 190 have engaged the contacts 185 and 207, respectively, the switch 176 again is moved to cease to short circuit the current source 48. Thereafter, the voltmeter 46 is again triggered to read the voltage drop between the probes 29 and 30.

After a predetermined period of time, the voltmeter 46 is deenergized and the coupler 202 is simultaneously triggered to transmit the reading from the voltmeter 46 to the card punch 203. At the same time that the coupler 202 was energized, the switch 176 was positioned to short circuit the current source 48 and the timing motor 163 was deenergized by the switch 161 moving from engagement with the contact 162 and into engagement with the open contact 210.

However, because of the momentum of the motor 163, the cam 169 rotated sufficiently to cause the switch 204 to cease to be connected to the contact 206 whereby the coupler 202 was inactivated. Likewise, the cams 174 and 175 moved sufficiently to again return the switches 184 and 190, respectively, into engagement with the contacts 186 and 191 whereby another cycle may begin upon the timing motor 163 again being energized.

Since the current values were ascertained during the first two readings by the voltmeter 46 and the voltage drop ascertained during the last two readings by the voltmeter 46, the spreading resistance of the material of the specimen 31 may be readily ascertained. The two values of the current are averaged as are the two values of the voltage drop in the specimen 31 to produce a more accurate determination of the spreading resistance.

It should be understood that all spreading resistance measurements are made at low current and voltage levels. This is to assure that the resistance measurement is in a linear portion of the voltage-current characteristic. The current levels are typically $10^{18}$ to $10^{13}$ amperes. For P-type silicon the power, which is the product of spreading resistance voltage and current, preferably should not exceed $10^{15}$ watts. For N-type silicon, the spreading resistance voltage preferably should not exceed $3 \times 10^{12}$ volts.

The calculations for the spreading resistance at this particular point on the specimen 31 may be calculated either by the operator or by a computer. The card, which has been punched by the card punch 203 so as to have the voltages registered thereon, would be fed to a computer to permit the desired calculations by the computer.

After the completion of the cycle of the timing motor 163, the lamps 211 and 212 are deenergized. This indicates to the operator that the arm 91 may be moved to the left in FIG. 4 by moving the handle 123 to the left. As a result, the roller 115 is again positioned within the recess 117 in the latch 111 as shown in FIG. 4.

At this time the lever 132 must be pivoted to again expose the micrometer 71 to the operator whereby the specimen 31 may be advanced the desired increment for the next voltage readings. The micrometer 71 permits calibrated movements of the specimen 31.

It should be understood that it is not necessary to raise the hood 140 during each movement of the specimen 31. This is because the micrometer 71 is relied upon to properly position the specimen 31. Thus, the specimen 31 and the probe assemblies 25—27 remain in a dark area.

After completion of the movement of the specimen 31, the lever 132 is again moved to dispose the cover 130 in the position of FIG. 4. After this, the lever 103 is moved downwardly and another cycle like the cycle, which has been previously described, occurs.

If one of the layers of the specimen 31 should be very thin, it would be necessary to step the specimen 31 at right angles to the direction in which it is moved by the micrometer 71 during each rotation of the micrometer 71. This is because the small thickness of such a layer would not permit a sufficient number of readings to be obtained to enable an accurate determination of the spreading resistance at the various points to be determined so as to enable the desired resistivity profile to be plotted as described in the aforesaid Gardner et al. application. Accordingly, when one of the layers of the specimen 31 is very thin, it is necessary to open the hood 140 after each cycle so that the micrometer 70 may be turned by the operator to step the specimen 31 at right angles to the direction in which it is moved by the micrometer 71.

It should be understood that the current lines 178 and 182 and the lines from the voltmeter 46 to the switches 193 and 196 are shielded with the shields. These shields along with baseplate 12 and the hood 140 are connected to the guard circuit of the voltmeter 46.

It should be understood that the spreading resistance probe 29 creates a mechanical disturbance in the specimen 31 during each engagement therewith. However, since this same disturbance occurs in the specimen 31 each time that the probe 29 engages it due to control of the force with which the probe 29 contacts the specimen 31, these disturbances will be reproducible during every cycle. As a result, the disturbances are cancelled out since they occur during every cycle.

By utilizing the shifting connections of the digital voltmeter 46, the present invention eliminates the requirement for an ammeter. As a result, the present invention reduces the cost of the apparatus since the shifting mechanism for changing the connections of the digital voltmeter 46 is not as expensive as an ammeter. Additionally, the digital voltmeter 46 provides a more accurate reading of the current magnitude than can be obtained from an ammeter.

While the present invention has described the center probe 29 as being the spreading resistance probe, it should be understood that any of the three probes may function as the spreading resistance probe. There is no requirement that the spreading resistance probe be disposed between the other two probes.

While the specimen 31 has been described as having the probes 28—30 moved into engagement with the specimen 31, it should be understood that the specimen 31 could be mounted in such a manner that it would be moved into the probes 28—30. In order to control the penetration of the probes 28 and 30 into the specimen 31 when the specimen 31 is moved into the probes 28—30, it would be necessary to substantially increase the area of contact of each of the probes 28 and 30. This would allow the specimen 31 to contact the probes 28 and 30 prior to engaging the spreading resistance probe 29 without the probes 28 and 30 penetrating the specimen 31 beyond the desired depth as the specimen 31 is advanced into contact with the spreading resistance probe 29.

Furthermore, while the specimen 31 has been described as being moved by the micrometer 71 to position another area of the specimen 31 for engagement with the probes 28—30, it should be understood that the present invention would operate just as satisfactorily if the probes 28—30 were moved rather than the specimen 31. It is only necessary that there be relative movement between the probes 28—30 and the specimen 31 along the beveled surface. This is necessary to obtain a plurality of readings through the depth of each of the layers 33—35 of the specimen 31.

While the present invention has shown and described the specimen 31 as being a semiconductive device, for example, having a plurality of layers 33—35 of different conductivities, it should be understood that the present invention may be utilized to determine the spreading resistance of any material that is conductive. For example, a thin metal film could have its spreading resistance determined by the three-probe apparatus of the present invention.

While each of the specimens 31 may be of varying thickness, for example, it is not necessary to position each new specimen when it is disposed on the assembly 32. This is because the device that forms the beveled surface always produces the same distance between the beveled surface and the bottom of the specimen 31.

Furthermore, it is normally necessary to adjust the assembly 32 when calibrations of a new spreading resistance probe are being made through the use of bulk wafers, which are of the same conductivity throughout with the conductivity being known. This allows empirical determination of the characteristics of the spreading resistance probe.

While the various movements of the probes and the specimen have been described as being manually performed, it should be understood that the movements could be made automatically. In such an arrangement, the micrometers could be replaced by digital stepping motors and said digital computer employed to control the stepping motors. Likewise, motors would be employed to move the actuating arm 91 and the lever 103.

An advantage of this invention is that it insures good contact of a spreading resistance probe with the material during each engagement of the spreading resistance probe with the material. Another advantage of this invention is that a more accurate reading of the voltage drop through the material is obtained by connecting the voltmeter to the spreading resistance probe so that the resistance of the wire of the spreading resistance probe is substantially eliminated. A further advantage of this invention is that the determination of the spreading resistance of the material is not affected by ambient light. Still another advantage of this invention is that the effects of any RF field and any acoustical noise on the measurement of the spreading resistance are substantially reduced.

While the invention has been particularly shown and described with reference to a preferred embodiment thereof, it will be understood by those skilled in the art that various changes in form and details may be made therein without departing from the spirit and scope of the invention.

What we claim is:

1. An apparatus for use in determining the spreading resistance of a material of a specimen including:
   three probes;
   one of said probes being the spreading resistance probe;
   means to support said probes and the specimen in a vibration-free environment;
   means to cause relative movement between said probes and the specimen to cause engagement therebetween, said relative movement means being vibration free;
   and means to control relative movement between said one probe and the specimen by said relative movement means to insure that the other two of said probes are in contact with the specimen and disturbances created in the specimen by engagement with the other two of said probes have ceased before said one probe and the specimen engage.

2. The apparatus according to claim 1 including means to regulate at least the force with which said one probe engages the specimen, said regulating means being separate from said relative movement means.

3. The apparatus according to claim 1 including means to completely shield said probes and the specimen from light when said probes are in engagement with the specimen.

4. The apparatus according to claim 3 including means to insure that said shielding means is effective before any of said probes receives any current.

5. The apparatus according to claim 1 in which said relative movement means causes movement one of the other two of said probes and the specimen into engagement with each other prior to causing movement of the other of the other two of said probes and the specimen into engagement with each other.

6. The apparatus according to claim 1 including:
   a current source;
   means to supply current from said current source to two of said probes;
   and means to prevent supply of current from said current source to any of said probes for a predetermined period of time after said one probe engages the specimen.

7. The apparatus according to claim 1 including means to produce relative movement between said probes and the specimen when said probes and the specimen are not engaged with each other after completion of determining the spreading resistance of the material of the specimen at one point on the specimen to cause another area of the specimen to have the process engaged therewith whereby the spreading resistance of the material of the specimen at another point may be determined, said producing means being separate from said relative movement means, said relative movement means causing engagement between said probes and the specimen in a substantially straight line, and said producing means creating movement in a direction substantially perpendicular to the substantially straight line along which said probes engage the specimen.

8. The apparatus according to claim 7 including means to prevent said producing means from being activated when said probes and the specimen are in engagement with each other.

9. The apparatus according to claim 1 in which said relative movement means causes movement of each of said probes into engagement with the specimen.

10. The apparatus according to claim 9 including means to obtain a reproducible engagement of the probes with the specimen which controls the velocity and force of the probes during descent and the force of the probes after engagement.

11. The apparatus according to claim 9 including means to move each of said probes to a first position when another area of the specimen is to be engaged by said probes and to a second position when the specimen is to be removed and another specimen is to be engaged by said probes.

12. The apparatus according to claim 1 including:
   a probe arm for supporting each of said probes;
   means to pivotally mount each of said probe arms;
   and said relative movement means controlling movement of each of said probe arms to control movement of said probe supported by said probe arm into engagement with the specimen.

13. The apparatus according to claim 12 in which said relative movement means includes cam means controlling movement of each of said probe arms to cause each of said probe arms to move said probe supported on said probe arm into engagement with the specimen in accordance with the position of said cam means.

14. The apparatus according to claim 1 in which said relative movement means causes said one probe to engage the surface of the specimen substantially perpendicular to the surface of the specimen.

15. An apparatus for use in determining the spreading resistance of a material of a specimen including:
   three probes;
   one of said probes being the spreading resistance probe;
   means to support said probes and the specimen in a vibration-free environment;
   a separate probe arm to support each of said probes;
   separate means to pivotally mount each of said probe arms for moving said probe supported on said probe arm toward and away from the specimen;
   and separate means to regulate the force with which each of said probes engage the specimen to obtain reproducible engagement of each of said probes with the specimen;
   said regulating means including:
   separate weight means supported by each of said probe arms;
   and separate means to adjust the position of each of said weight means relative to said pivotal mounting means for said probe arm by which said weight means is supported.

16. An apparatus for determining the spreading resistance of a material of a specimen including:
   three probes;
   one of said probes functioning as the spreading resistance probe;
   a power supply;
   means to connect said power supply to said one probe and to a second of said probes, said connecting means including resistance means between said power supply and the contact of said one probe with the specimen;
   voltage measuring means;
   and means to selectively connect said voltage measuring means across said resistance means or between said one probe and a third of said probes, said selectively connecting means being connected to said one probe adjacent the specimen when said voltage measuring means is connected to said third probe.

17. The apparatus according to claim 16 including:
   means to change the direction of flow of current from said power supply to said one and second probes when said voltage measuring means is connected by said selectively connecting means across said resistance means whereby said voltage measuring means may measure the voltage drop due to current flow through said resistance means in both directions;

and said changing means also changing the direction of flow of current from said power supply to said one and second probes when said voltage measuring means is connected to said one and third probes whereby said voltage means may measure the voltage drop due to current flow through the material of the specimen in both directions.

18. The apparatus according to claim 17 in which: said changing means includes:

first switch means connected to one side of said power supply, said first switch means being movable to connect said one side of said power supply to one of said one and second probes and then to the other of said one and second probes and second switch means connected to the other side of said power supply, said second switch means being movable to connect said other side of said power supply to the one of said one and second probes that is not connected to said first switch means;

and means to control the positions of said first switch means and said second switch means.

19. The apparatus according to claim 17 including means to control said changing means and said selectively connecting means.

20. The apparatus according to claim 19 in which:

said power supply is a constant current source;

and said control means includes means to short circuit said constant current source when said changing means is changing the direction of current flow.

21. The apparatus according to claim 16 including:

means to cause relative movement between said probes and the specimen to cause engagement therebetween;

means to control relative movement between said one probe and the specimen by said relative movement means to insure that the other two of said probes are in contact with the specimen and disturbances created in the specimen by engagement between the other two probes and the specimen have ceased before said one probe and the specimen engage;

and means to prevent supply of current from said power supply to any of said probes for a predetermined period of time after said one probe engages the specimen.

22. The apparatus according to claim 21 including:

means to completely shield said probes and the specimen from light when said probes are in engagement with the specimen;

and means to insure that said shielding means is effective before current is supplied from said power supply to any of said probes.

23. The apparatus according to claim 21 including:

a probe arm for supporting each of said probes;

means to pivotally mount each of said probe arms;

and said relative movement means controlling movement of each of said probe arms to control movement of said probe supported by said probe arm into engagement with the specimen.

24. A method of determining the spreading resistance of a material of a specimen including:

supporting three probes and the specimen in a vibration-free environment;

moving two of the three probes and the specimen into engagement with each other;

moving a third of the three probes and the specimen into engagement with each other after the first two probes are in engagement with the specimen and disturbances created in the specimen by engagement between the first two probes and the specimen have ceased;

applying a current of known magnitude to the specimen through one of the two probes and the third probe a predetermined period of time after the third probe and the specimen engage with each other;

measuring the voltage between the third probe and the other of the two probes to ascertain the voltage drop produced by current flow through the specimen, and determining the spreading resistance in accordance with the voltage drop and the current.

25. The method according to claim 24 including controlling the force with which each of the probes and the specimen engage each other to cause the same reproducible force to occur between each of the probes and the specimen during each engagement therebetween.

26. The method according to claim 24 including controlling at least the force with which the third probe and the specimen engage each other to cause the same reproducible force to occur between the third probe and the specimen during each engagement therebetween.

27. The method according to claim 24 including moving one of the two probes and the specimen into engagement with each other prior to moving the other of the two probes and the specimen into engagement with each other.

28. The method according to claim 24 including completely enclosing the probes and the specimen within a dark area when the current is applied and the voltage is measured.

29. The method according to claim 24 in which:

each of the probes is moved into reproducible engagement with the specimen by controlling the velocity and force of the probes during descent and the force of the probes after engagement with the specimen.

30. The method according to claim 24 including applying a current in both directions through the one of the two probes and the third probe to cause the current to flow in opposite directions through the specimen to determine the magnitude of the current and if the third probe has good contact with the specimen before measuring the voltage due to current flow through the specimen.

31. The method according to claim 30 including:

applying a current in both directions through one of the two probes and the third probe to cause the current to flow in opposite directions through the specimen when the voltage is measured;

and averaging the two voltage drops to determine the voltage drop.

32. The method according to claim 24 including:

applying a current though said one of the two probes and said third probe as great as $10^{13}$ amperes;

and limiting the product of the spreading resistance voltage and current to not exceed $10^{15}$ watts.

33. A method of determining the spreading resistance of a material of a specimen including:

supporting three probes and the specimen in a vibration-free environment;

moving the three probes into engagement with the specimen;

controlling the velocity and force of the probes during descent and the force with which each of the probes engages the specimen to obtain reproducible engagement of the probes with the specimen;

applying a current of known magnitude through two of the probes to the specimen a predetermined period of time after the probes have engaged the specimen;

measuring the voltage between one of the two probes and a third probe to ascertain the voltage drop produced by flow of the current through the specimen;

and determining the spreading resistance in accordance with the voltage drop and the current.

34. A method of moving probes and a specimen that is to have the spreading resistance of its material determined into contact with each other for use in determining the spreading resistance of the material of the specimen comprising:

supporting three probes and the specimen in a vibration-free environment;

moving two of the three probes and the specimen into engagement with each other;

moving a third of the three probes and the specimen into engagement with each other after the first two probes and the specimen are in engagement with each other and disturbances created in the specimen by engagement between the specimen and the first two probes have ceased;

and utilizing one of the two probes and the third probe to supply current to the specimen and utilizing the other of the two probes and the third probe to measure voltage drop in the specimen.

35. A method of moving probes into contact with a specimen that is to have the spreading resistance of its material determined comprising:

supporting three probes and the specimen in a vibration-free environment;

moving the three probes into engagement with the specimen;

controlling the velocity and force with which each of the probes engages the specimen to regulate the impact and controlling the force of the probes after engagement with the specimen to obtain reproducible engagement of the probes with the specimen;

and utilizing two of the three probes to apply current to the specimen and utilizing one of the two probes and the third of the three probes to measure voltage drop in the specimen.